United States Patent
Mapitigama et al.

(10) Patent No.: US 7,766,590 B2
(45) Date of Patent: Aug. 3, 2010

(54) CARGO PALLET COVER

(75) Inventors: K. W. M. Achala Madhara Mapitigama, Mount Lavinia (LK); Andrew Alexander Davies, Shropshire (GB); Darren Alan Friberg, Marietta, GA (US)

(73) Assignee: AMSAFE Bridport Limited, Bridport (GB)

( * ) Notice: Subject to any disclaimer, the term of this patent is extended or adjusted under 35 U.S.C. 154(b) by 369 days.

(21) Appl. No.: 11/767,262

(22) Filed: Jun. 22, 2007

(65) Prior Publication Data
US 2008/0003075 A1    Jan. 3, 2008

(30) Foreign Application Priority Data
Jun. 22, 2006    (GB) ................... 0612334.3

(51) Int. Cl.
*B60P 7/08* (2006.01)
(52) U.S. Cl. .......................... 410/97; 410/118
(58) Field of Classification Search .................. 410/96, 410/97, 100, 117, 118; 248/499; 206/597; 87/2
See application file for complete search history.

(56) References Cited

U.S. PATENT DOCUMENTS

| 3,173,539 | A | * | 3/1965 | Looker |
| 6,866,453 | B2 | * | 3/2005 | Looker et al. ................. 410/96 |

FOREIGN PATENT DOCUMENTS

| EP | 1 302 401 A1 | 4/2003 |
| JP | 2001180767 A | 7/2001 |
| JP | 2002362615 A | 12/2002 |
| JP | 2004131142 A | 4/2004 |
| WO | 02/062619 A1 | 8/2002 |
| WO | 2004/082995 A1 | 9/2004 |

OTHER PUBLICATIONS

Search Report for Application No. GB0612334.3: Date of Research: Oct. 11, 2006.

* cited by examiner

*Primary Examiner*—Stephen Gordon
(74) *Attorney, Agent, or Firm*—Karish & Bjorgum, PC

(57) ABSTRACT

A cargo pallet cover having a main panel and a plurality of side panels extending therefrom, the main panel being adapted to overlie a load on a pallet in use and the side panels being adapted to hang down against the sides of the load, each side panel being attached to an adjacent side panel along adjacent edges to define a corner, the pallet cover including a plurality of net attachment devices for attaching a pallet net to the pallet cover.

18 Claims, 3 Drawing Sheets

CARGO PALLET COVER

CROSS-REFERENCE TO RELATED APPLICATION

This application claims the benefit of and priority to United Kingdom Application No. 0612334.3, filed Jun. 22, 2006, the entire content of which is incorporated by reference herein.

FIELD OF THE INVENTION

The present invention relates to a cargo pallet cover.

BACKGROUND OF THE INVENTION

When goods are being transported by airfreight they are typically loaded onto pallets and secured in place using a suitable pallet net. Once the load is secured on a pallet it may be loaded into the cargo hold of an aircraft. One such net is disclosed in WO 02/062619 A1. The pallet net is of generally conventional cruciform construction and comprises a main panel which overlies the load in use and a plurality of wing panels which hang down against the sides of the load. The bottom edge of each wing panel is provided with a plurality of double stud fittings which can be secured to a complimentary seat track on the pallet. Each side edge of the wing panels meets with an adjacent side edge to define a net corner. The net corners are releasably secured using any suitable means. In the pallet net disclosed in WO 02/062619 A1 the net includes a plurality of corner securement devices which may be utilised to close the corner and secure the load onto the pallet net for transportation. In other known nets the corner may be secured by means of a lashing line which extends from the main panel between the side panels and may be threaded between adjacent side panels to secure the corner.

Cargo pallet covers are commonly used to cover a load built up on a pallet for transportation. The pallet cover serves to provide some form of additional protection to the load, typically to protect the load from the elements. The additional protection may take a wide variety of forms, for example it may serve to provide a waterproof barrier layer, a thermal insulation layer, an electrical insulation layer, impact protection, or any other properties which may be required for the specific load being transported. Alternatively, the pallet cover may take the form of fireproofing for the load to prevent a fire spreading from the load to other items stored in the cargo hold. A wide variety of pallet covers are known and the material properties will vary depending on the protection required for the specific load. Once the load has been built up on the pallet the pallet cover is placed on top of the load and the combination of load and cover is secured to the pallet by a pallet net in the manner described above.

Currently available pallet covers are known to function well, but a number of problems exist, most notably with their handling and use on irregular shaped loads. When a load requires to be protected by a conventional pallet cover it adds an extra step into the loading procedure. Rather than simply placing the load on a pallet and securing it with a pallet net, it must also be covered by a pallet cover. This extra step takes additional time which can amount to a significant amount of time when the huge number of goods transported in this manner is taken into account.

Standard pallet covers will typically be manufactured from a textile material and will generally comprise a rectangular main panel which overlies the load in use and a plurality of rectangular side panels which hang down against the sides of the load. When the load is of a regular rectangular shape then the pallet cover will simply adapt to the shape of the load. However, it is quite common for the load to be of an irregular shape (typically one side will be higher than the other). Standard pallet nets are provided with reefing hooks which are used to take up any slack in the net material caused by irregular loads. When the load is of an irregular shape the pallet cover tends to bunch up and is also prone to hang below the bottom of the pallet. This can cause problems in securing the pallet net and can be time consuming to resolve for operators.

SUMMARY OF THE INVENTION

It is an object of the present invention to overcome some of the problems of the prior art, or at least to provide an alternative to the currently available equipment.

According to the present invention there is provided a cargo pallet cover having a main panel and a plurality of side panels extending therefrom, the main panel being adapted to overlie a load on a pallet in use and the side panels being adapted to hang down against the sides of the load, each side panel being attached to an adjacent side panel along adjacent edges to define a corner, the pallet cover including a plurality of net attachment devices for attaching a pallet net to the pallet cover.

By providing net attachment devices for attaching a cargo net to the pallet cover a user is presented with a simple integrated system which makes it easier and quicker to deploy the cargo pallet cover and pallet net. The time saved in fitting the cover and net will represent significant savings in terms of time required to load goods on a pallet.

In an embodiment of the invention the net attachment devices may conveniently comprise top net attachment devices spaced along a top edge of at least one of the side panels, adjacent the main panel. In an embodiment of the invention the net attachment devices may additionally or alternatively comprise bottom net attachment devices spaced along a bottom edge of at least one of the side panels, remote from the main panel. In an embodiment of the invention each side panel is provided with net attachment devices. The top net attachment devices ensure that the main panel of the pallet cover and the main panel of the pallet net remain aligned during use. This is important as it facilitates improved handling of the two components and reduces the overall time required to secure a load onto a pallet.

The bottom net attachment devices ensure that the bottom edges of the pallet cover are aligned with the bottom edges of the pallet net. This is particularly important when the load which has been built up on the pallet is of a reduced height or is of an irregular shape. In the prior art the pallet cover was placed on the load prior to the pallet net. If the load was of a reduced height the bottom edge of the pallet cover would overhang the pallet edge. This would then impede the location of the double stud fittings of the pallet net in the seat track as it would be obscured from view. In the present invention the bottom edge of the pallet cover will be aligned with the bottom edge of the pallet net. This will ensure that no matter what the height of the load the pallet cover will not overhang the pallet edge.

By providing each side panel with net attachment devices the pallet cover and pallet net may be fully integrated. It will no longer be a two stage process to cover the load and secure it to the pallet. The procedure can be implemented in a single step, which is no more complex than the conventional securing of a load to a pallet using a pallet net.

In an embodiment of the invention the net attachment devices comprise intermediate net attachment devices spaced along a line intermediate the top and bottom edges of at least one of the side panels. In an embodiment of the invention the intermediate net attachment devices are provided on each of the side panels. The intermediate net attachment devices are preferably spaced along a line parallel to the top and bottom edges of the side panel. It is particularly preferred that the intermediate net attachment devices are arranged such that they will be associated with reefing hooks on the pallet net in use. The term "associated with reefing hooks" herein simply requires that the intermediate net attachment devices are located at a distance from the bottom edge of the side panel which is approximately the same distance as that of a reefing hook on the wing panel or the net to which it will be attached. The actual location of the intermediate net attachment devices may be slightly above or slightly below the location of the reefing hooks. The intermediate net attachment devices will typically be provided in the lower half of the side panels, typically between a quarter and half way up the side panel in a direction measured away from the bottom edge.

Pallet nets are typically provided with reefing hooks at a set distance from the bottom edge of the wing panels. If a load is of a reduced height then the wing panel will not be taut when it is secured to the pallet. In order to remedy this the reefing hooks are engaged with a portion of the net mesh on the wing panel above the reefing hook in order to take up the slack.

The intermediate net attachment devices are associated with the reefing hooks on the pallet net and function to reef in the slack in the pallet cover. If the intermediate net attachment devices are not provided then the pallet cover would tend to bunch up when the load was of a reduced height. The excess material would gather at the base of the load and in addition to being unsightly it could interfere with the operation of the pallet net. When the reefing hooks on the pallet net are engaged with a portion of the net mesh the excess material is gathered into a fold in the pallet net. Exactly the same occurs with the pallet cover when the intermediate net attachment devices are attached to the wing panel of the pallet net in the region of the reefing hooks—the excess material is gathered in a fold and kept neatly out of the way. In this way, the lower portion of the pallet cover, between the intermediate net attachment devices and the bottom edge of the side panels, is maintained at a predetermined position regardless of the height of the load. The lower portion of the cover is supported by the pallet net so that it doesn't overhang the pallet.

In an embodiment of the invention the net attachment devices comprise releasable attachment means. This enables the pallet cover or pallet net to be replaced in case of damage or for the pallet cover to be changed when the situation requires it. The releasable attachment means may conveniently comprise any suitable means which provides a secure attachment which is able to withstand the forces to which the load will typically be subjected, while being quickly and easily released by an operator when required, preferably without the need for any special tools or equipment. The releasable attachment means may suitably comprise press stud closures. The press stud closures may be provided on lengths of textile webbing such that a portion of the webbing may be passed through the net mesh of the pallet net and the stud may be received in the housing to secure the pallet cover to the pallet net.

In an embodiment of the invention, the net attachment devices comprise permanent attachment means. This ensures that the pallet net and the pallet cover cannot be separated. The permanent attachment means may conveniently comprise any suitable means which provides a permanent point of attachment between the pallet cover and pallet net, for example, the pallet net may be stitched directly to the pallet cover.

In an embodiment of the invention the net attachment devices comprise non-permanent attachment means. The non-permanent attachment devices may conveniently be in the form of open hooks which could be utilised to attach the pallet cover to the pallet net.

In an embodiment of the invention the intersections between adjacent panels of the pallet cover are formed with external seams and hems. The external seams are preferably waterproof. In an embodiment of the invention the pallet cover may be provided without external hems and seams. Some advantages of the external hems and seams will be described below.

Firstly, they ensure that all the stitching and additional components of the pallet cover are isolated from the interior of the pallet cover. This is particularly important when the pallet cover is provided to fireproof a load. If a fire was to break out in the load then the fire will not come into contact with the stitching, which could potentially damage the integrity of the pallet cover if it were to fail. By insulating the stitching from the inner surfaces of the pallet cover it is protected from anything which may possibly cause damage, such as extremes of temperature, contamination or other potentially damaging environmental factors.

In addition to improving the integrity of the pallet cover, the external seams and hems also provide convenient locations for the net attachment devices. It is particularly preferred that the net attachment devices are provided on the external hems. By providing the net attachment devices on the external hems it avoids the need to penetrate the walls of the pallet cover with stitching to attach the net attachment devices. As above, this helps to preserve the integrity of the cover.

In an embodiment of the invention an intermediate external hem is formed in the body of the side panels at the intended location of the intermediate net attachment devices, the external hem being parallel to the top and bottom edges of the side panels. As with the top and bottom net attachment devices, it is preferred that the intermediate net attachment devices are provided on the intermediate external hem.

In an embodiment of the present invention a cover expansion panel is provided between adjacent side panels in at least one net corner. More preferably a cover expansion panel is provided in at least two corners. The cover expansion panels are typically triangular in shape and taper outwardly from the top edge, where they adjoin the main panel, to the bottom edge, where they form a portion of the bottom edge of the side panels. The function of the expansion panels is to permit a small degree of expansion for the side panels to aid fit on a wider variety of load shapes. When the net is secured to the pallet any excess material of the corner expansion panels will be gathered at the corner.

In an embodiment of the invention the pallet cover is provided with loading straps to facilitate loading and transportation of the pallet cover. The loading straps are provided on the side panels and preferably run parallel to the top and bottom edges. In the case where the pallet cover has a rectangular main panel the loading straps may suitably be provided on the long side panels. When not in use the pallet cover and associated pallet net may be folded in such a manner that the loading straps remain accessible. It should then be possible to engage the forks of a fork lift truck with the loading straps in order to lift the pallet cover and pallet net into position. It is further preferred that the loading straps are integral with the intermediate net attachment devices and/or the top net attachment devices.

According to a second aspect of the present invention there is provided a combination of a cargo pallet cover and a pallet net, the pallet cover comprising a plurality of net attachment devices for attaching the pallet cover to the pallet net.

DESCRIPTION OF THE FIGURES

In order to provide a better understanding of the present invention reference will be made to the accompanying drawings which show, solely by way of example, the invention, and in which.

DETAILED DESCRIPTION OF THE PREFERRED EMBODIMENTS

Figure 1:
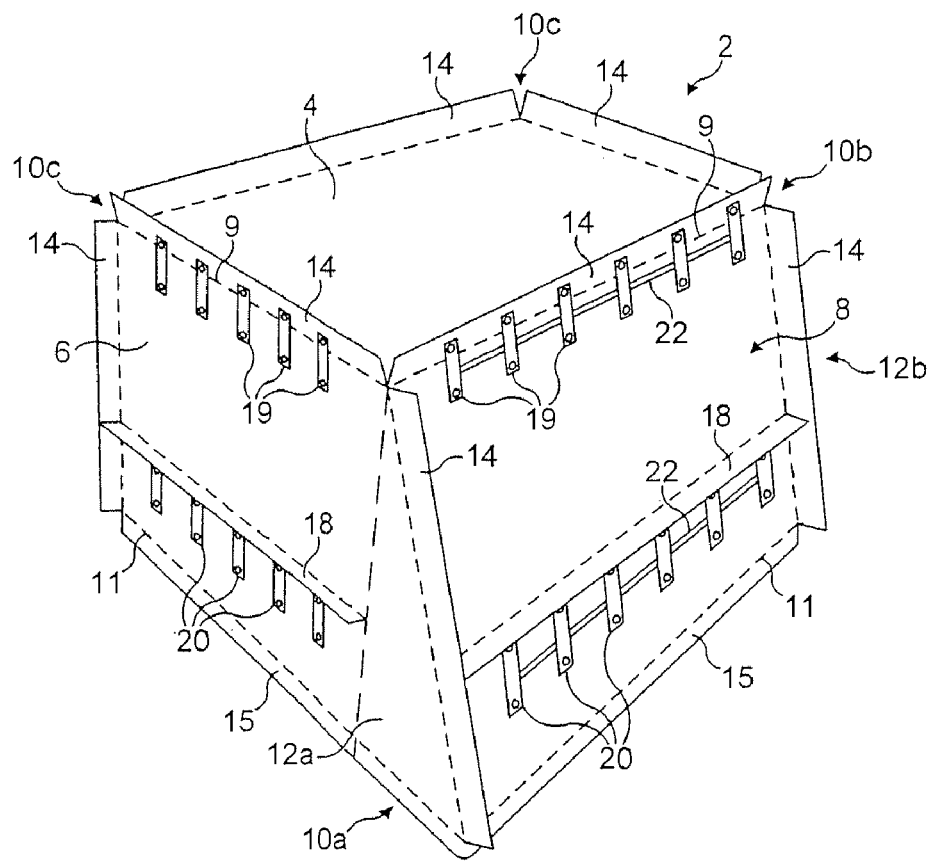
FIG. 1 shows a perspective view of a pallet cover on a load.
Figure 2:
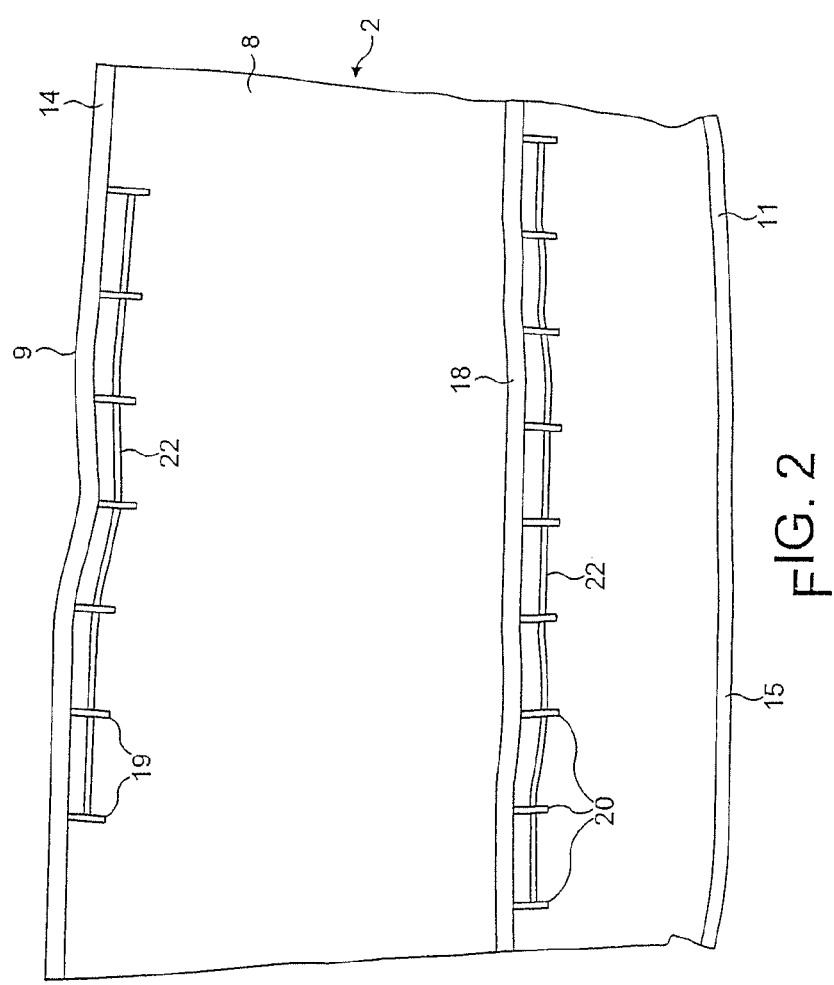
FIG. 2 shows a side view of the pallet cover of FIG. 1.

Referring firstly to FIGS. 1 and 2, these show a pallet cover 2 on a regular shaped load (not visible). Although one of the key features of the present invention is the integration of the pallet cover 2 and or pallet net, the net is omitted from FIGS. 1 and 2 for clarity. In addition, the pallet is not visible in FIGS. 1 and 2. The pallet cover 2 comprises a rectangular main panel 4 which overlies the load and four side panels 6,8 (only two visible) which hang down against the side of the load. A top edge 9 of the side panels 6,8 is attached to the main panel 4 and a bottom edge 11 hangs free adjacent the base of the load. Adjacent side panels are stitched together to form corners 10a-d. Two of the corners 10a, 10b are provided with corner expansion panels 12a,12b, which enable the side panels 6,8 to expand slightly to fit a wide variety of load sizes. The corner expansion panels 12a,12b are generally triangular in shape and taper outwardly from a point adjacent the main panel 4 to a point adjacent the bottom edge of the wing panels 6,8. The expansion panels 12a, 12b enable the pallet cover 2 to expand for easy fitting over a load built on a pallet. If the expansion panels 12a, 12b were not there it may be difficult to fit the pallet cover 2 over a regular shaped load.

The expansion panels 12 are an optional feature of the present invention and, although they improve the handling of the pallet cover 2, it will be clear to the skilled person that the invention would function without the expansion panels 12. The present invention is directed towards pallet covers 2 both with and without expansion panels 12. When the pallet net corners are secured (as will be described in relation to FIG. 3) the material of the expansion panels 12a,12b is gathered together at the corners 10a, 10b.

Cargo pallet covers 2 may be utilised for a wide variety of purposes, such as fireproofing, waterproofing and thermal insulation and the material from which the pallet cover 2 is fabricated will depend on its intended function. However, the present invention relates to pallet covers in general and is applicable to most pallet covers regardless of their intended function. Consequently, the material of the pallet cover is not relevant to the present invention. In most cases the pallet cover will be formed from a textile material, which may be treated to provide certain properties. Alternatively, the pallet cover may be provided with pockets into which different inserts may be inserted in order to provide particular properties.

The joints between the main panel 4 and the side panels 6, 8 along the top edge 9 of the side panels and between adjacent side panels 6, 8 are provided with external hems 14 and seams. An additional hem 15 is provided along the bottom edge 11 of the side panels 6, 8. The provision of these external hems 14, 15 and seams fulfills two basic functions. Firstly, it ensures that all stitching and additional components of the pallet cover 2 are isolated from the interior of the pallet cover 2. This is particularly important when the pallet cover 2 is provided to fireproof a load. If a fire was to break out in the load then it would not come into contact with the stitching. The interior of the pallet cover 2 will have been treated to withstand the flames and heat and may also have other properties for counteracting the fire. The fire will be starved of oxygen and will eventually burn itself out. The stitching is potentially a vulnerable point in such a construction, but by isolating it from the interior of the pallet cover it helps to protect it from the heat and flames. By insulating the stitching from the inner surfaces of the pallet cover 2 it is protected from anything which may possibly cause damage, such as extremes of temperature, contamination or other potentially damaging environmental factors.

A further function of the external hems 14,15 is that they provide a convenient location for attachment of additional components to the pallet cover 2. By attaching additional components to the external hems 14,15 it avoids the need to penetrate the walls of the pallet cover 2 with stitching and helps to maintain the integrity of the structure.

An additional external hem 18 is provided in the body of each side panel 6,8 at a location intermediate the top and bottom edges 9,11 of the side panels 6,8. The additional external hem 18 runs parallel to the top and bottom edges 9,11 and is located at a set distance from the bottom edge 11. The distance corresponds generally to the distance which conventional reefing hooks are spaced from the bottom edge of standard pallet nets as will be described in more detail in relation to FIGS. 3 and 4.

The external hem 14 along the top edge 9 and the intermediate hem 18 are provided with net attachment devices 19,20 for attaching the pallet cover 2 to a pallet net. The net attachment devices 19,20 are in the form of lengths of webbing material which are provided with press stud fasteners. In use a first end of the webbing member, bearing a portion of the press stud fastener, may be passed around a portion of the net mesh of a pallet net and the press stud fastener may be closed to secure the pallet cover 2 to the pallet net. The net attachment devices 19,20 are releasable such that the net may be separated from the pallet cover 2, for example to facilitate repair of either component. In an alternative embodiment of the invention the net attachment devices may be permanent or non-permanent.

Figure 3:
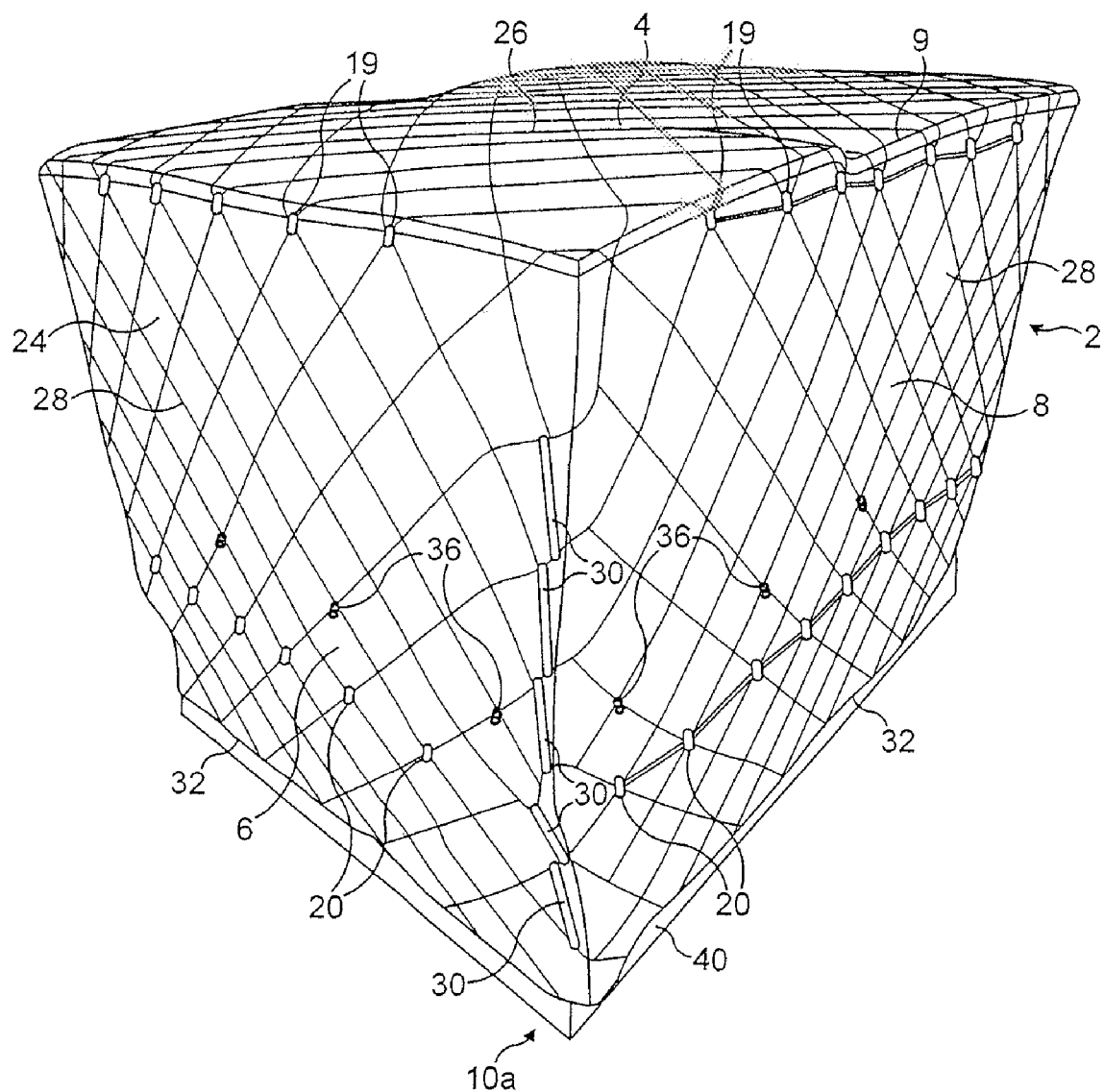
FIG. 3 shows a perspective view of a pallet cover and pallet net on a load.

The net attachment devices 19 spaced along the top edge 9 of the side panels 6,8 are used to attach the pallet cover 2 to a pallet net such that the main panel 4 of the pallet cover 2 is aligned with the main panel of the pallet net. This ensures that the pallet cover 2 and the pallet net may be fully integrated as shown in FIG. 3. This offers much improved handling and makes it a one step process to deploy the pallet cover 2 and pallet net. The number of net attachment devices 19,20 and the spacing between them may vary depending on the size of the cover 2 and the strength of the net attachment devices 19,20. Typically, the net attachment devices will be spaced apart by 20-50 cm.

As mentioned above, the net attachment devices 20 are provided on the intermediate hem 18 at a height from the bottom edge 11 approximately equal to the distance of the reefing hooks on a standard pallet net. The primary function of the intermediate net attachment devices 20 will become clear in relation to FIG. 4. As an additional benefit, they serve to provide additional support for the pallet net and ensure that the material of the pallet cover 2 and pallet net are neatly stored.

The external hems 14, 15, 18 are optional features of the present invention and, although they may improve the functionality of the pallet cover 2, it will be clear to the skilled person that the invention would function without the external hems 14, 15, 18. The present invention is directed towards pallet covers 2 both with and without external hems 14, 15, 18.

In addition to the net attachment devices 19,20, the long side panels 8 (and its opposite side panel) are provided with loading straps 22 which run parallel to the top and bottom edges 9,11. When the main panel 4 is square the loading straps 22 may conventionally be provided on any two opposite side panels. The loading straps 22 are provided along the top hem 14 and the intermediate hem 18 and they are integral with the net attachment devices 19,20. The loading straps 22 may be engaged by the forks of a fork lift truck for transporting and deploying the pallet cover 2. When not in use the pallet cover 2 and pallet net may be folded in such a manner that the loading straps 22 are easily accessible and may be engaged by the forks of a fork lift. This is an important feature as the combined weight of the pallet cover 2 and pallet net makes handling difficult.

The net attachment devices 19,20 and the loading straps 22 may conveniently be of a contrasting colour to the body of the pallet cover 2 to permit easy identification by users. Advantageously, the top net attachment devices 19 and the top loading strap 22 and the intermediate net attachment devices 21 and loading strap 22 may be provided in different colours.

Figure 4:
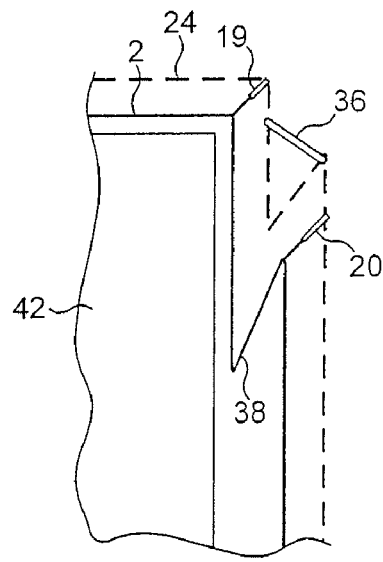
FIG. 4 shows a schematic side view of a pallet cover and pallet net on a load.

Referring now to FIGS. 3 and 4, FIG. 3 shows a perspective view of a pallet cover 2 and pallet net 24 deployed on a load which has been built on a pallet 40. The pallet cover 2 is the same as that shown in FIGS. 1 and 2 and like parts will be numbered the same.

As can be seen, the net attachment devices 19,20 have been fastened around strands of the pallet net 24 to secure the pallet cover 2 to the pallet net 24. The pallet net 24 is of conventional cruciform design as disclosed in WO 02/062619 A1. The net comprises a main panel 26 and a plurality of wing panels 28 extending therefrom. The wing panels 28 hang down against the side panels 6,8 of the pallet cover 2 and are provided with corner securement devices 30 to secure adjacent wing panels 28 together. The bottom edges 32 of the wing panels 28 are provided with securement means in the form of double stud fittings (not shown), which engaged with corresponding members on the pallet 40 to secure the pallet net 24 to the pallet 40. The load shown in FIG. 3 is of regular shape and height, however, reefing hooks 36 are provided on the pallet net 24 for reefing in any excess material when the load is not of standard shape or height. The reefing hooks 36 are provided at a set distance from the bottom edge 32 of the wing panels 28.

The pallet cover 2 and pallet net 24 act as a single entity and may be deployed in a single step rather than the two step process previously required. The net attachment devices 19,20 are secured to the pallet net 24 along the top edge 9 of the pallet cover 2 and along the intermediate hem 18. This ensures that the pallet cover 2 and pallet net 24 are neatly aligned and makes it easy to deploy both in a single step.

When the combined pallet cover 2 and pallet net 24 is deployed on a load the first step is to secure the double stud fittings to the seat track on the pallet 40. Next, any excess material can be taken up using the reefing hooks 36 (as will be discussed in relation to FIG. 4). Finally, the corners of the pallet net 24 are secured using the corner securement devices 30. In the embodiment shown in FIG. 3 the corner securement devices are the QUICKZIP® corner securement devices, however, conventional lashing wires may also be used during the process of securing the load, the pallet cover 2 is passive and is attached and positioned as a result of its connection to the pallet net 24.

In some situations the load will not be of a standard height. In these cases when the double stud fittings are engaged with the pallet 40 there will be some excess material. This is not desirable as the pallet cover 2 and pallet net 24 should ideally be taut to ensure that the load is secure on the pallet 40. In conventional situations when no pallet cover is in use the excess material in the pallet net 24 is simply reefed in using reefing hooks 36. The reefing hooks 36 are provided at a set distance from the bottom edge 32 of the pallet net 24 and they can be engaged with a portion of the net mesh above them to take up any slack. If a pallet cover 2 is deployed in conjunction with a pallet net 24, but it does not have the intermediate net attachment devices 20 then the excess material of the pallet cover 2 will tend to gather at the base of the pallet cover 2 and can get in the way and impede the loading of the pallet 40.

According to the present invention the pallet cover 2 is provided with intermediate net attachment devices 20 which help to overcome this problem. FIG. 4 shows a schematic side view of a reduced height load 42 with a combined pallet cover 2 and pallet net 24 deployed. The intermediate net attachment devices 20 attaches the pallet cover 2 to the pallet net 24 in the region of the reefing hooks 36. The term "in the region of" means that the net attachment devices 20 are attached to the pallet net 24 at approximately the same location as the reefing hooks 36. The actual attachment may be slightly below the location of the reefing hooks 36 or it could be above the location of the reefing hooks 36. It is preferred that the intermediate net attachment devices 20 are attached to the pallet net 24 in the region of, but below the location of the reefing hooks 36, but it will be clear to the skilled person that the present invention will also function when the intermediate net attachment devices 20 are attached to the pallet net 24 in the region above the location of the reefing hooks 36.

If it is necessary to utilise the reefing hooks 36 in order to take up some slack in the pallet net 24 material then the pallet cover 2 will also be reefed in by virtue of the attachment of the intermediate attachment devices 21. As can be clearly seen in FIG. 4, the excess material of the pallet cover 2 is gathered neatly into a fold 38 in the pallet cover 2. Accordingly, the bottom edge 11 of the pallet cover 2 will always be level with the pallet 40, and will not hang over the edge. The distance from the intermediate attachment devices 20 to the bottom edge 11 of the pallet cover 2 will always be the same with no sagging of the pallet cover 2 material. Any excess material will be gathered neatly in the fold 38.

The invention claimed is:

1. A cargo pallet cover comprising:
   a main panel adapted to overlie a load on a pallet; and
   a plurality of side panels extending from the main panel, each of the plurality of side panels being adapted to hang down against a corresponding sides of the load and attached to an adjacent one of the plurality of side panels along adjacent edges to define a corner,
   wherein the pallet cover includes net attachment devices for attaching a pallet net to the pallet cover.

2. A cargo pallet cover according to claim 1, wherein the net attachment devices comprise top net attachment devices spaced along a top edge of at least one of the plurality of side panels.

3. A cargo pallet cover according to claim 1, wherein the net attachment devices comprise bottom net attachment devices spaced along a bottom edge of at least one of the plurality of side panels.

4. A cargo pallet cover according to claim 1, wherein the net attachment devices comprise intermediate net attachment devices spaced along a line intermediate a top edge and a bottom edge of at least one of the plurality of side panels.

5. A cargo pallet cover according to claim 4, wherein the intermediate net attachment devices are arranged such that they would be proximate to reefing hooks on said pallet net if said pallet net were attached to the pallet cover by the net attachment devices.

6. A cargo pallet cover according to claim 1, wherein the net attachment devices are provided on each of the plurality of side panels.

7. A cargo pallet cover according to claim 1, wherein the net attachment devices comprise releasable attachment means.

8. A cargo pallet cover according to claim 7, wherein the releasable attachment means comprise press stud closures.

9. A cargo pallet cover according to claim 8, wherein the press stud closures are provided on lengths of textile webbing.

10. A cargo pallet cover according to claim 1, wherein the attached adjacent edges are formed with external seams and hems.

11. A cargo pallet cover according to claim 1, wherein an intermediate external hem is formed in a body of at least one of the plurality of side panels, the intermediate external hem being parallel to top and bottom edges of the at least one of the plurality of side panels.

12. A cargo pallet cover according to claim 10, wherein the net attachment devices are provided on the external hems.

13. A cargo pallet cover according to claim 11, wherein at least one of the net attachment devices is provided on the intermediate external hems.

14. A cargo pallet cover according to claim 1, wherein a first cover expansion panel is provided between adjacent ones of the plurality of side panels in at least one corner.

15. A cargo pallet cover according to claim 14, wherein the cargo pallet cover comprises at least two adjacent corners and wherein cover expansion panels, which include said first cover expansion panel, are each provided in the at least two adjacent corners.

16. A cargo pallet cover according to claim 1, wherein the pallet cover is provided with loading straps to facilitate loading and transportation of the pallet cover.

17. A cargo pallet cover according to claim 4, further comprising loading straps integral with the intermediate net attachment devices.

18. A combination of a cargo pallet cover according to claim 1 and a cargo net, wherein the net attachment devices secure the pallet cover and cargo net together.

* * * * *